US009659490B2

(12) United States Patent
Chang

(10) Patent No.: US 9,659,490 B2
(45) Date of Patent: *May 23, 2017

(54) SELF-SERVICE CROSSING AID FOR PEDESTRIANS

(71) Applicant: International Business Machines Corporation, Armonk, NY (US)

(72) Inventor: Siao C. L. Chang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/575,447

(22) Filed: Dec. 18, 2014

(65) Prior Publication Data

US 2016/0180703 A1    Jun. 23, 2016

(51) Int. Cl.
| G08G 1/07 | (2006.01) |
| G08G 1/005 | (2006.01) |
| H04W 48/16 | (2009.01) |
| H04W 4/00 | (2009.01) |
| H04W 4/02 | (2009.01) |
| G09B 21/00 | (2006.01) |

(52) U.S. Cl.
CPC .......... *G08G 1/005* (2013.01); *G09B 21/003* (2013.01); *G09B 21/008* (2013.01); *H04W 4/008* (2013.01); *H04W 4/021* (2013.01); *H04W 48/16* (2013.01)

(58) Field of Classification Search
CPC ...................................................... G08G 1/005
USPC ................................................ 340/944, 925
See application file for complete search history.

(56) References Cited

U.S. PATENT DOCUMENTS

| 6,828,918 B2 * | 12/2004 | Bowman | G06F 1/163 |
| | | | 340/4.1 |
| 8,730,060 B2 * | 5/2014 | Sennett | G08C 17/02 |
| | | | 340/4.1 |
| 8,786,466 B1 | 7/2014 | Aladas | |
| 2009/0322566 A1 * | 12/2009 | Shirakawa | G01C 21/20 |
| | | | 340/944 |
| 2013/0002452 A1 * | 1/2013 | Lauren | G09B 21/006 |
| | | | 340/944 |
| 2016/0110998 A1 | 4/2016 | Todasco | |
| 2016/0151231 A1 | 6/2016 | Villar Cloquell | |
| 2016/0267787 A1 | 9/2016 | Whitney | |

OTHER PUBLICATIONS

US Patent Application Serial No.: filed on.
List of IBM Patents or Patent Applications Treated as Related (Appendix P), filed herewith.

(Continued)

*Primary Examiner* — Brent Swarthout
(74) *Attorney, Agent, or Firm* — Maeve Carpenter

(57) ABSTRACT

A tool for a crossing aid on a mobile device. The tool determines, by a first computer processor, a unique ID associated with a crossing signal. The tool searches, by the first computer processor, for a wireless access point (WAP) having the unique ID. The tool determines, by the first computer processor, whether the WAP having the unique ID is found. Responsive to determining that the WAP having the unique ID is found, the tool determines, by the first computer processor, haptic feedback. The tool initiates, by the first computer processor, the haptic feedback on the mobile device to aid in crossing.

10 Claims, 4 Drawing Sheets

(56) References Cited

OTHER PUBLICATIONS

U.S. Appl. No. 14/848,926, filed Sep. 9, 2015.
List of IBM Patents or Patent Applications Treated as Related (Appendix P), filed herewith, Sep. 9, 2015.
U.S. Appl. No. 15/282,057, filed Sep. 30, 2016.

* cited by examiner

SELF-SERVICE CROSSING AID FOR PEDESTRIANS

BACKGROUND OF THE INVENTION

The present invention relates generally to public safety, and more particularly to a self-service crossing aid for visually and hearing impaired pedestrians.

Road intersections, such as two-way or four-way road crossings, that are alternatively used by road traffic (i.e., automobiles, buses, motorcycles, and trains, etc.) and pedestrians utilize a variety of conventional approaches to help pedestrians identify when they have the right of way (i.e., when it is safe for pedestrians to cross the intersection), such as light signals, audible signals, and tactile signals.

For visually impaired pedestrians, audible signals can be used to help identify when they have the right of way. However, at junctions with multiple crossings, it can be difficult to identify the correct audible signal for a target crossing chosen by a visually impaired pedestrian. For example, at a four-way intersection with multiple crossing zones, a visually impaired pedestrian could mistake an audible signal of a nearby crossing as an audible signal for a target crossing chosen by the pedestrian, resulting in confusion and an unsafe crossing condition.

For visually and hearing impaired pedestrians, tactile signals can be used to help identify when they have the right of way. However, it is difficult for them to tell whether they still have the right of way once they begin crossing the intersection. For example, a tactile signal may indicate to a visually and hearing impaired pedestrian when it is safe to cross, but offers no way of informing them how much time remains before it is no longer safe to cross.

SUMMARY

Aspects of an embodiment of the present invention disclose a method, system, and computer program product for a crossing aid on a mobile device. The method includes determining, by a first computer processor, a unique ID associated with a crossing signal. The method includes searching, by the first computer processor, for a wireless access point (WAP) having the unique ID. The method includes determining, by the first computer processor, whether the WAP having the unique ID is found. Responsive to determining that the WAP having the unique ID is found, the method includes determining, by the first computer processor, haptic feedback. The method includes initiating, by the first computer processor, the haptic feedback on the mobile device to aid in crossing.

DETAILED DESCRIPTION

Embodiments of the present invention recognize that for visually or hearing impaired pedestrians, at junctions with multiple crossings it can prove difficult to identify the correct audible signal indicating that it is safe to cross.

Embodiments of the present invention provide the capability to notify pedestrians when they have a right of way to cross an intersection, as well as provide an indication of how long they have to cross before the right of way expires.

Implementation of such embodiments may take a variety of forms, and exemplary implementation details are discussed subsequently with reference to the figures.

Figure 1:
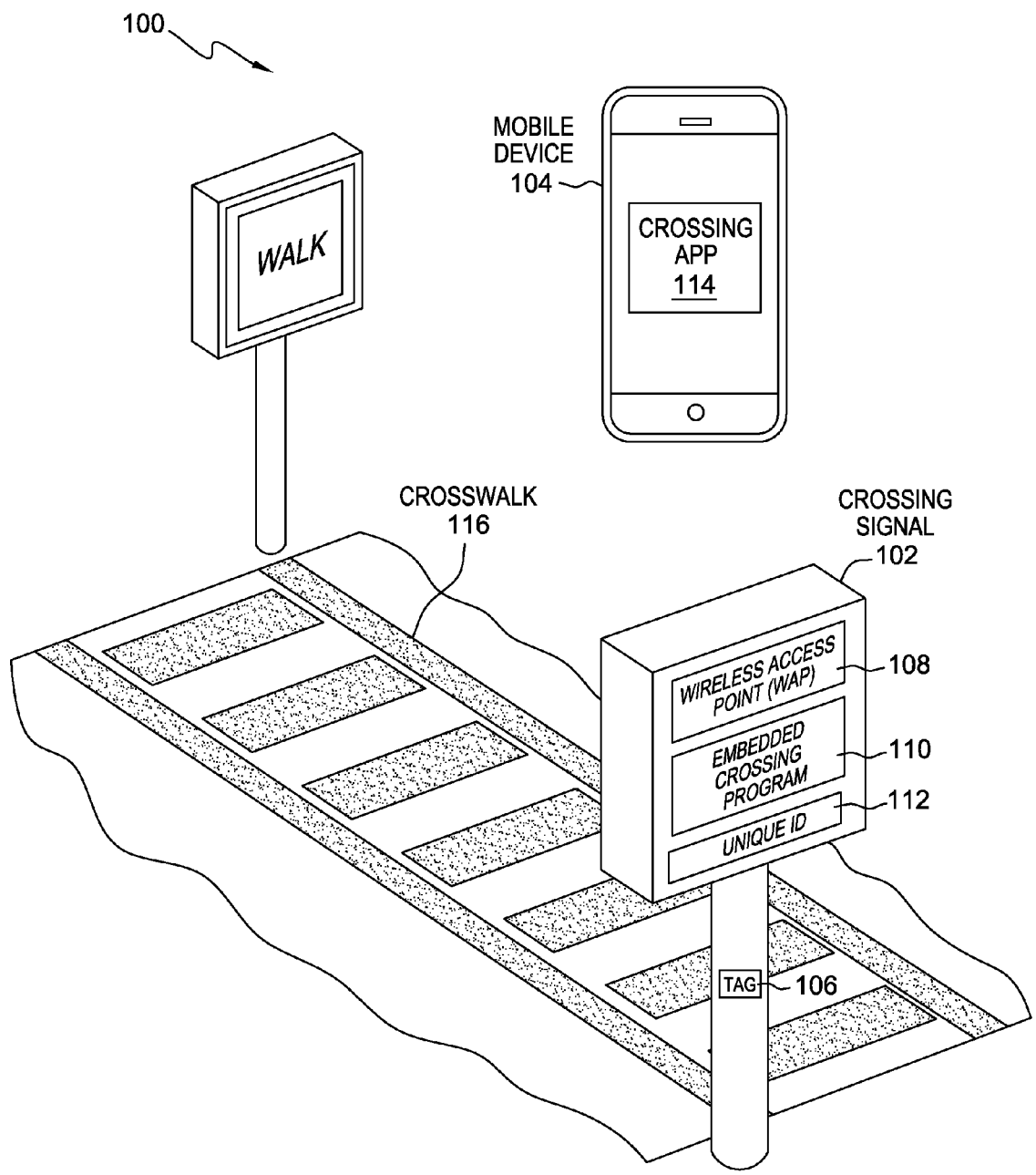
FIG. 1 illustrates a functional block diagram depicting a data processing environment, generally designated 100, in accordance with an embodiment of the present invention.

The present invention will now be described in detail with reference to the figures. FIG. 1 is a functional block diagram illustrating a data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes a crossing signal 102, a mobile device 104, and a crosswalk 116.

Crossing signal 102 is a conventional pedestrian crossing signal for indicating when a pedestrian can safely cross an intersection via a crosswalk, such as crosswalk 116. In the exemplary embodiment, crossing signal 102 is a freestanding crossing signal that allows pedestrians and road traffic to use crosswalk 116 alternately. In some embodiments, crossing signal 102 is a signal consisting of electric lamps or light-emitting diode (LED) panels. In some embodiments, crossing signal 102 may include a button (not shown), whereby pressing the button triggers a signal. In other embodiments, crossing signal 102 may be integrated into a regular traffic light arrangement, or may be on a separate fixture, for example, where the crossing is not at an intersection. In yet another embodiment, crossing signal 102 may integrate a countdown timer, showing pedestrians how many seconds are remaining for a crossing phase. In the exemplary embodiment, crossing signal 102 includes tag 106, wireless access point (WAP) 108, embedded crossing program 110, and unique ID 112.

Tag 106 is any machine-readable smart tag, sticker, or barcode capable of embedding information for reading by a mobile device, such as mobile device 104. In the exemplary embodiment, tag 106 is embedded with a unique ID associated with a crossing signal, such as unique ID 112 of crossing signal 102. In the exemplary embodiment, tag 106 is located externally on crossing signal 102, positioned in such a place that allows tactile access to a pedestrian. In one embodiment, tag 106 can be a Braille-like quick response code (QR code) embedded with unique ID 112, which can be read by a mobile device, such as mobile device 104, by scanning of the Braille-like QR code with an integrated camera (not shown) on mobile device 104. For example, a visually impaired pedestrian could approach crossing signal 102, locate tag 106 by feeling for a Braille-like QR code, and access unique ID 112 of crossing signal 102 by scanning tag 106 with an integrated camera on mobile device 104. In another embodiment, tag 106 can be any type of smart tag capable of utilizing near field communication (NFC) technology embedded with unique ID 112, which can be read by a mobile device, such as mobile device 104, by coming into a contact range with the smart tag. For example, a visually or hearing impaired pedestrian could approach crossing signal 102, and simply by being in a close proximity to tag 106, access unique ID 112 through an integrated NFC chip on mobile device 104. In some embodiments, there may be one or more tags, such as tag 106, located externally on a crossing signal, such as crossing signal 102. For example, where a single crossing signal services two separate crosswalks, such as a crossing signal on a corner of an intersection directing pedestrian traffic in both an east-to-west direction and a north-to-south direction, two tags, such as tag 106, may be located on corresponding sides of the crossing signal, each tag having a distinct unique ID associated with each direction serviced by the crossing signal.

WAP 108 is a conventional wireless access point device capable of facilitating an exchange of information over radio waves. In the exemplary embodiment, WAP 108 is configured to broadcast a service set identifier (SSID) that incorporates a unique ID for a crossing signal, such as unique ID 112 of crossing signal 102. In the exemplary embodiment, WAP 108 is searchable by a mobile device having WiFi capability, such as mobile device 104. In the exemplary embodiment, it is not necessary for crossing signal 102 and mobile device 104 to be connected over a network in order to broadcast and search for a SSID. In some embodiments, crossing signal 102 and mobile device 104 can be interconnected by WAP 108. In alternative embodiments, WAP 108 may include wire cables, wireless communication links, fiber optic cables, routers, switches and/or firewalls. In some embodiments, WAP 108 can be any combination of connections and protocols capable of supporting communications between crossing signal 102, mobile device 104, tag 106 and crossing app 114. In yet another embodiment, WAP 108 may also be implemented as a wide area network (WAN). FIG. 1 is intended as an example and not as an architectural limitation for the different embodiments. In some embodiments, a crossing signal, such as crossing signal 102, may include one or more WAPs. For example, where a single crossing signal services two separate crosswalks, such as a crossing signal on a corner of an intersection directing pedestrian traffic in both an east-to-west direction and a north-to-south direction, two WAPs, such as WAP 108, may be located on corresponding sides of the crossing signal, each WAP having a distinct SSID and a unique ID associated with the each direction serviced by the crossing signal.

Embedded crossing program 110 is a software-based program configured to manage WAP 108. In the exemplary embodiment, embedded crossing program 110 provides the capability to enable and disable WAP 108, based, at least in part, on a crossing phase (i.e., a time when a pedestrian has a right of way to cross an intersection). In the exemplary embodiment, embedded crossing program 110 provides the capability to configure a SSID for WAP 108, wherein configuring the SSID includes integrating a unique ID for a crossing signal as well as a countdown value (i.e., a value representative of the time remaining in a crossing phase). In the exemplary embodiment, embedded crossing program 110 provides the capability to update the SSID based, at least in part, on a change in the countdown value, and broadcast the updated SSID after each update. In some embodiments, the countdown value can be embedded in the WAP beacon frame, for example, in a basic set service identification (BSSID), a vendor specific field, or a length field of information element of the WAP beacon frame.

In an alternative embodiment, embedded crossing program 110 may be a software-based program configured to manage one or more wireless access points, such as WAP 108, from a centralized server computer (not shown) for controlling one or more crossing signals, such as crossing signal 102, within data processing environment 100.

Unique ID 112 is a unique identifier associated with a crossing signal, such as crossing signal 102. In the exemplary embodiment, unique ID 112 can be made up of any combination of numeric characters, alphabetic characters, and special characters, etc. In the exemplary embodiment, unique ID 112 is incorporated into tag 106 and a SSID of WAP 108.

Mobile device 104 is a conventional mobile device and may be, for example, a tablet computer, a personal digital assistant (PDA), a smart phone, a thin client, or any other electronic device or computing system capable of communicating with tag 106 and WAP 108 of crossing signal 102. For example, mobile device 104 can be a smart phone capable of scanning and receiving data from both tag 106 and WAP 108. In the exemplary embodiment, mobile device 104 includes crossing app 114 for providing a self-service crossing aid for visually and hearing impaired pedestrians.

In an alternate embodiment, mobile device 104 may be any wearable electronic device, including wearable electronic devices affixed to eyeglasses and sunglasses, helmets, wristwatches, clothing, wigs, and the like, capable of sending, receiving, and processing data. For example, mobile device 104 may be a wearable electronic device, such as a wristwatch having WiFi capability, capable of executing an application, such as crossing app 114, for scanning a computer readable tag, such as tag 106, gathering a unique ID for a crossing signal, such as unique ID 112 of crossing signal 102, and providing tactile feedback, such as vibration, to notify a user of the mobile device it is safe to cross a crosswalk, such as crosswalk 116.

Crossing app 114 is a software-based program capable of providing a self-service crossing aid for visually and hearing impaired pedestrians. In the exemplary embodiment, crossing app 114 enables a visually or hearing impaired pedestrian to identify a crossing signal at a crosswalk, such as crossing signal 102 at crosswalk 116, by scanning a machine-readable tag located on the crossing signal, such as tag 106 of crossing signal 102. In the exemplary embodiment, crossing app 114 determines a unique ID for the crossing signal, such as unique ID 112 of crossing signal 102, utilizes the unique ID to search for a wireless access point within the crossing signal, such as WAP 108 of crossing signal 102, and notifies a pedestrian when it is safe to use the crosswalk (i.e., when the pedestrian has a right of way) through haptic (i.e., tactile) feedback, such as vibration.

In an alternative embodiment, crossing app 114 may be a software-based program operating on a server computer (not shown) within data processing environment 100. In this embodiment, mobile device 104 may scan a machine-readable tag located on a crossing signal, such as tag 106 of crossing signal 102, and communicate information to crossing app 114 on the server computer via a network (not shown) within data processing environment 100 to provide a self-service crossing aid for visually and hearing impaired pedestrians.

Crosswalk 116 is a place designated for pedestrians to cross a road. In the exemplary embodiment, crosswalk 116 is designed to keep pedestrians together where they can be seen by motorists, and where they can cross most safely across the flow of vehicular traffic. In one embodiment, crosswalk 116 can be a marked pedestrian crossing found at an intersection, and can also be at other points on a busy road that would otherwise be unsafe to cross without assistance. In one embodiment, crosswalk 116 is installed where a large number of pedestrians are attempting to cross, such as in a shopping area, or where vulnerable road users, such as school children, regularly cross. In the exemplary embodiment, crosswalk 116 is marked with one or more crossing signals, such as crossing signal 102, for clearly separating when each type of traffic, such as pedestrians and road vehicles, can use the crossing.

Figure 2:
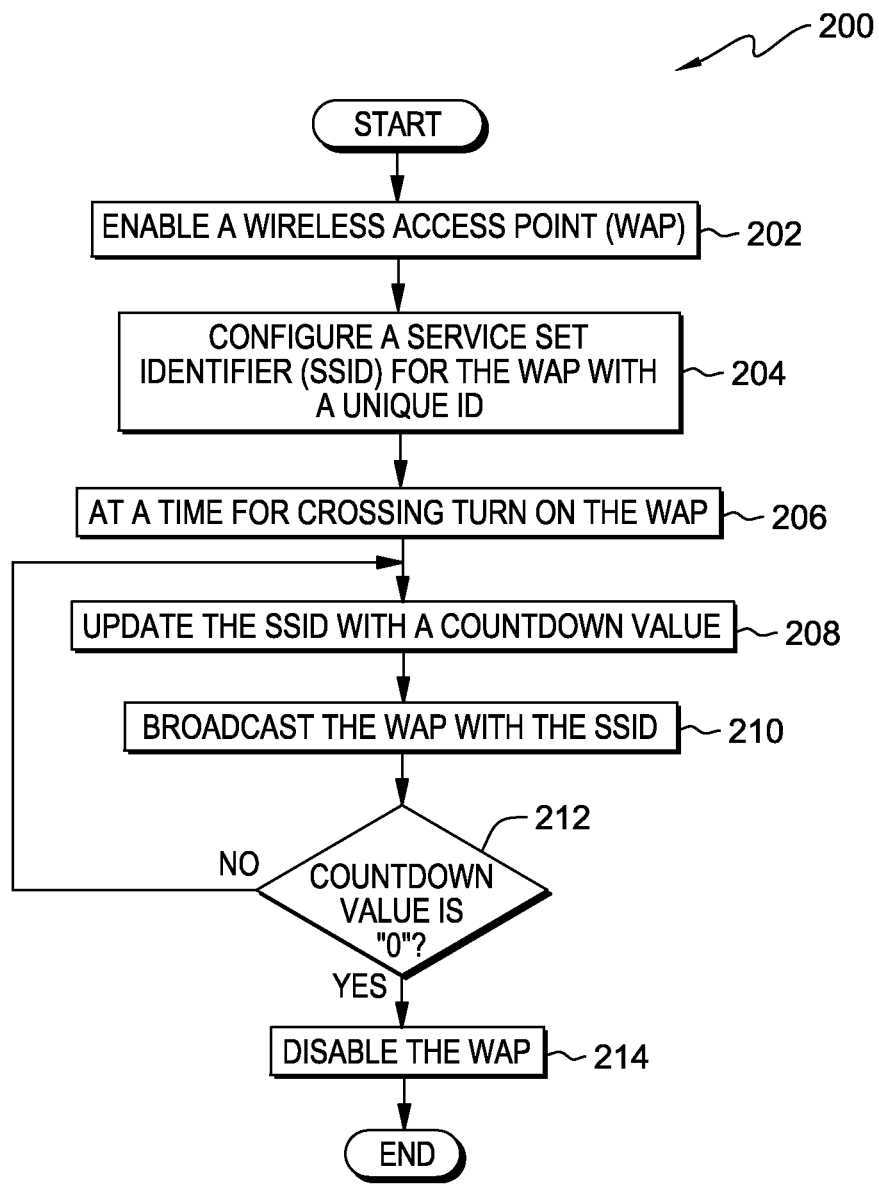
FIG. 2 illustrates a flowchart of an exemplary process flow, generally designated 200, depicting steps of an embedded crossing program for a self-service crossing aid, in accordance with an embodiment of the present invention.

FIG. 2 is a flowchart of an exemplary process flow, generally designated 200, depicting steps of embedded crossing program 110 for a self-service crossing aid, in accordance with an embodiment of the present invention.

Embedded crossing program 110 enables a wireless access point (WAP) (202). In the exemplary embodiment, embedded crossing program 110 enables a WAP, such as WAP 108, to send out a beacon frame with a unique ID for a crossing signal, such as unique ID 112 of crossing signal 102. The beacon frame is a management frame in an 802.11 based wireless local area network (WLAN) containing all the information about the network. In the exemplary embodiment, the beacon frame is transmitted by WAP 108 in an infrastructure basic service set (BSS) periodically to announce the presence of the WLAN.

Embedded crossing program 110 configures a service set identifier (SSID) for the WAP with a unique ID (204). In the exemplary embodiment, embedded crossing program 110 configures the SSID for WAP 108 with a unique ID of a crossing signal, such as unique ID 112 of crossing signal 102. For example, unique ID 112 of crossing signal 102 may be 12345678. Embedded crossing program 110 configures the SSID for WAP 108 to include unique ID 112 and a countdown value, such that the SSID may be "1234567 [countdown value]". In an alternative embodiment, embedded crossing program 110 configures a WAP with a countdown value embedded in a basic set service identification, a vendor specific field, or a length field of information element of a beacon frame. In the alternative embodiment, the SSID is constant (i.e., does not change with a change in the countdown value), and WLAN drivers at the WAP embed the countdown value in the BSSID, such that a mobile device, such as mobile device 104, can extract the countdown value from the BSSID.

Embedded crossing program 110, at a time for crossing, turns on the WAP (206). In one embodiment, embedded crossing program 110 determines a time for crossing (i.e., a pedestrian right of way) exists by monitoring traffic signals associated with a crosswalk, such as crosswalk 116. For example, embedded crossing program 110 may monitor a traffic signal sequence, and when, for example, the traffic signal indicates a red stop light for vehicle traffic, determining that a pedestrian right of way exists. Responsive to determining that a pedestrian right of way exists, embedded crossing program 110 turns on WAP 108.

Embedded crossing program 110 updates the SSID with a countdown value (208). In the exemplary embodiment, embedded crossing program 110 updates the SSID for WAP 108 with a countdown value, the countdown value representing an amount of time left before the pedestrian right of way expires. For example, where a pedestrian right of way for a crosswalk, such as crosswalk 116, is set to last for a countdown of fifteen seconds, embedded crossing program 110 updates the SSID for WAP 108 with a countdown value of "15", such that the updated SSID may be "1234567_15". In the exemplary embodiment, embedded crossing program 110 continuously updates the SSID for WAP 108 as time expires for the pedestrian right of way, such that, for example, embedded crossing program 110 updates the SSID at fourteen seconds remaining to "1234567_14", at thirteen seconds remaining to "1234567_13", and so on, until the countdown value is zero (i.e., time has expired for the pedestrian right of way).

Embedded crossing program 110 broadcasts the WAP with the SSID (210). In the exemplary embodiment, embedded crossing program 110 broadcasts WAP 108 with the SSID, wherein the SSID includes both the unique ID for the crossing signal, such as unique ID 112 of crossing signal 102, and a countdown value indicating an amount of time remaining for a pedestrian right of way at a crosswalk, such as crosswalk 116. In the exemplary embodiment, embedded crossing program 110 broadcasts WAP 108 with the SSID continuously until the countdown value reaches "0" (i.e., zero), such that each time embedded crossing program 110 updates the SSID of WAP 108 with an updated countdown value, embedded crossing program 110 broadcasts WAP 108 with the updated SSID.

Embedded crossing program 110 determines whether the countdown value is "0" (212). In the exemplary embodiment, embedded crossing program 110 determines whether the countdown value is "0" by monitoring a counter indicating an amount of time remaining for a pedestrian right of way. In one embodiment, when the counter indicates that the amount of time remaining expired (e.g., zero seconds remain), embedded crossing program 110 determines that the countdown value is "0".

In response to determining that the countdown value is not "0" (NO branch, 212), embedded crossing program 110 updates the SSID with a countdown value (208). In the exemplary embodiment, embedded crossing program 110, in response to determining that the countdown value is not "0" (i.e., that time has not expired for a pedestrian right of way), updates the SSID of WAP 108 with a countdown value indicative of the amount of time remaining for the pedestrian right of way. For example, where embedded crossing program 110 determines that the countdown value is "10" (i.e., ten second remain for the pedestrian right of way, embedded crossing program 110 updates the SSID of WAP 108 to "1234567_10".

In response to determining that the countdown value is "0" (YES branch, 212), embedded crossing program 110 disables the WAP (214). In the exemplary embodiment, in response to determining that the countdown value is "0" (i.e., that time has expired for the pedestrian right of way), embedded crossing program 110 disables WAP 108, thereby ending the broadcasting of the SSID of WAP 108.

Figure 3:
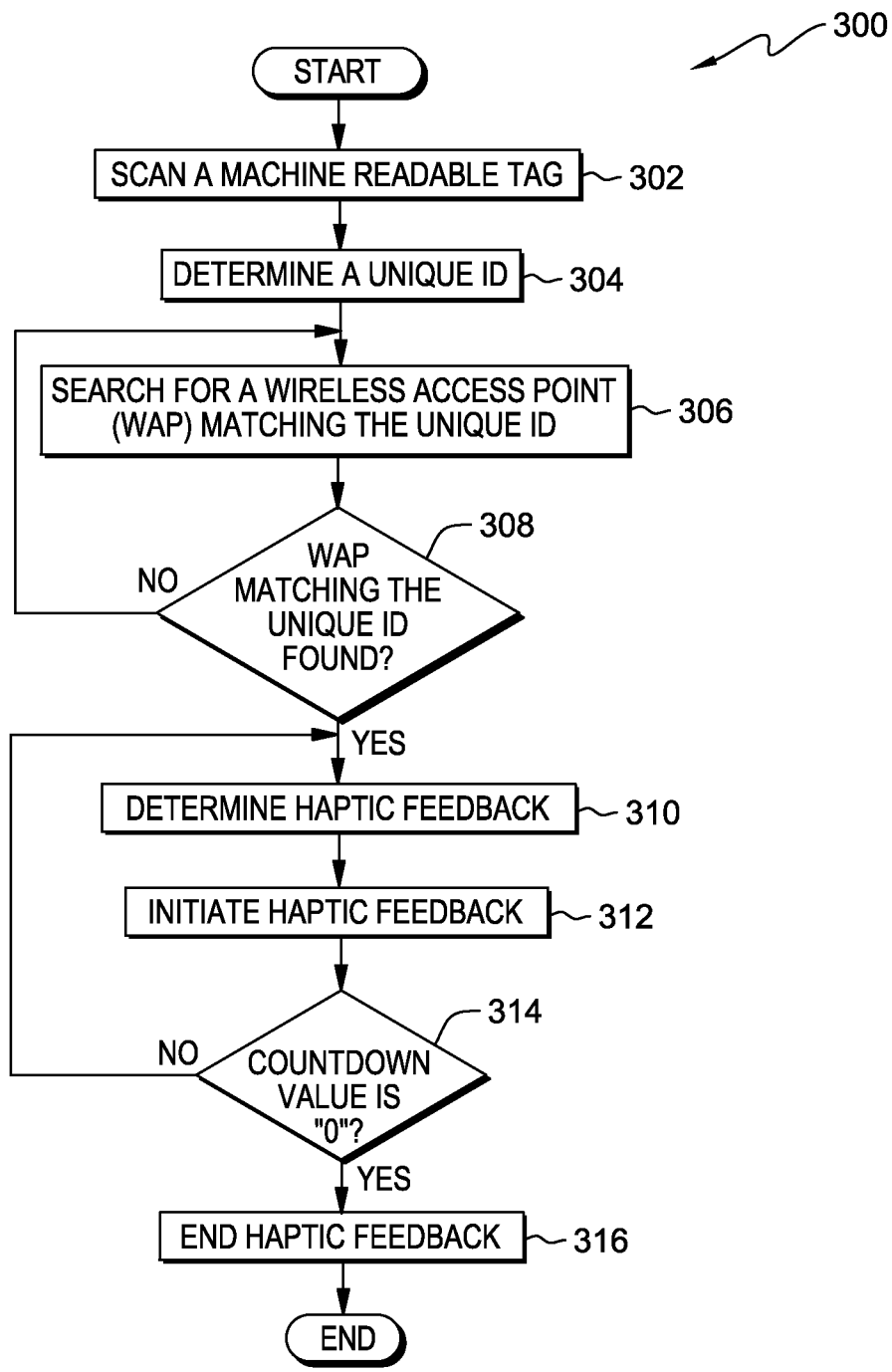
FIG. 3 illustrates a flowchart of an exemplary process flow, generally designated 300, depicting steps of a crossing app for a self-service crossing aid, in accordance with an embodiment of the present invention.

FIG. 3 is a flowchart of an exemplary process flow, generally designated 300, depicting steps of crossing app 114 for a self-service crossing aid, in accordance with an embodiment of the present invention.

Crossing app 114 scans a machine-readable tag (302). In the exemplary embodiment, crossing app 114 scans a machine-readable tag, such as tag 106, located on or near a crossing signal, such as crossing signal 102. Crossing app 114 scans the machine-readable tag to retrieve a unique ID for a crossing signal, such as unique ID 112 of crossing signal 102. In one embodiment, crossing app 114 can scan the machine-readable tag when incorporated within a mobile device, and the mobile device, such as mobile device 104, is placed within proximity near to the machine-readable tag, sufficient to enable near field communication (NFC) technology. In another embodiment, crossing app 114 can scan the machine-readable tag by utilizing a camera feature on a mobile device, such as mobile device 104, to capture an image of, for example, a QR code.

Crossing app 114 determines a unique ID (304). In the exemplary embodiment, crossing app 114 determines a unique ID associated with the crossing signal from the machine-readable tag by extracting the unique ID information embedded in the scanned machine-readable tag. For example, a unique ID for a crossing signal is "1234567". Crossing app 114 extracts the unique ID "1234567" from the machine-readable tag of the crossing signal, and associates that unique ID with the crossing signal.

Crossing app 114 searches for a wireless access point (WAP) matching the unique ID (306). In the exemplary embodiment crossing app 114 searches for a WAP with a SSID that contains the unique ID of the crossing signal. For example, crossing app 114 searches for all available WAPs within proximity of a mobile device, such as mobile device 104, for a WAP with a SSID of, for example, "1234567" that contains the unique ID of the crossing signal.

Crossing app 114 determines whether a WAP matching the unique ID is found (308). In the exemplary embodiment, crossing app 114 determines whether a WAP matching the unique ID is found by comparing the unique ID extracted from the machine-readable tag of the crossing signal to a SSID of a WAP in proximity to the mobile device. Crossing app 114 determines that a WAP matching the unique ID is found when the SSID of the WAP includes the unique ID. For example, crossing app 114 determines that a WAP matching a unique ID is found when the SSID of the WAP, such as "1234567_30", matches (i.e., includes) the unique ID, such as "1234567". Crossing app 114 determines that a WAP matching the unique ID is not found when the SSID of the WAP does not include the unique ID. For example, crossing app 114 determines that a WAP matching the unique ID is not found when the WAP having a SSID of "12348910_30" does not include the unique ID "1234567".

In response to determining that a WAP matching the unique ID is not found (NO branch, 308), crossing app 114 continues to search for a WAP matching the unique ID (306).

In response to determining that a WAP matching the unique ID is found (YES branch, 308), crossing app 114 determines haptic feedback (310). In the exemplary embodiment, crossing app 114 determines haptic feedback, or tactile feedback, including, without limitation, vibration, pulsing, and temperature, etc. to notify a user of a mobile device, such as mobile device 104, that they have the right of way (i.e., as indicated by the existence of a WAP matching the unique ID of the crossing signal), and to notify the user of an amount of time remaining before the right of way expires. In the exemplary embodiment, crossing app 114 determines haptic feedback proportional to an amount of time remaining before a pedestrian right of way expires at the crossing signal by utilizing the countdown value included in the SSID of the WAP. In one embodiment, crossing app 114 may determine haptic feedback as a vibration pattern, wherein the vibration pattern increases in speed, frequency, and duration, etc. as the countdown value in the SSID decreases. For example, where a countdown value of a SSID of a WAP, such as WAP 108, is "15", crossing app 114 may determine that a haptic feedback will begin as a slight vibration between "15" and "10", a moderate vibration between "10" and "5", and a steady vibration between "5" and "0", such that crossing app 114 notifies a pedestrian of a relative amount of time remaining before a right of way expires through increased intensity of haptic feedback relative to a decrease in an amount of time remaining before expiration of the right of way. In some embodiments, crossing app 114 determines a type of haptic feedback from a pre-configured, default type of tactile feedback, such as vibration. In some other embodiments, crossing app 114 determines a type of haptic feedback from a user preference. For example, crossing app 114 may present one or more haptic feedback options, such as vibration, temperature, pulsation, etc., to a user of a mobile device, such as mobile device 104, and prompt the user of the mobile device to select a preferred haptic feedback.

Crossing app 114 initiates haptic feedback (312). In the exemplary embodiment, crossing app 114 initiates haptic feedback the instant a countdown value in the SSID of the WAP changes. In one embodiment, crossing app 114 initiates haptic feedback by enabling an internal mechanism within a mobile device, such as mobile device 104, designed to produce tactile feedback. For example, crossing app 114 may initiate haptic feedback, such as vibration, through a conventional internal vibration mechanism integrated into a mobile device, such as mobile device 104.

Crossing app 114 determines whether a countdown value is "0" (314). In the exemplary embodiment, crossing app 114 determines whether a countdown value of a SSID of a WAP is "0" by extracting the countdown value from the SSID, such as "30", and by utilizing, for example, a counter, monitoring changes to the countdown value until the countdown value reaches "0". Crossing app 114 determines the countdown value is "0" when the countdown value extracted from the SSID is "0". In another embodiment, crossing app 114 can determine a countdown value is "0" when the SSID of the WAP becomes unavailable (i.e., as would happen once the countdown value reaches "0", indicating that the right of way for a pedestrian has expired).

In response to determining that a countdown value is not "0" (NO branch, 314), crossing app 114 continues to determine haptic feedback (310).

In response to determining that a countdown value is "0" (YES branch, 314), crossing app 114 ends haptic feedback (316). In the exemplary embodiment, in response to determining that the countdown value is "0", crossing app 114 ends all initiated haptic feedback, thereby notifying the user that the right of way for the pedestrian has expired. In one embodiment, crossing app 114 may end haptic feedback dramatically, such as when the countdown value nears "0", the haptic feedback may change to mark the end of the right of way for the pedestrian. For example, crossing app 114 may mark the end of haptic feedback with a sharp temperature increase subsequent to an increase in vibration, notifying the user of a mobile device, such as mobile device 104, that a right of way has expired through a dramatic change in type and frequency of the haptic feedback (i.e., when a vibration changes to a sharp temperature increase, the right of way has expired, or vise versa.)

Figure 4:
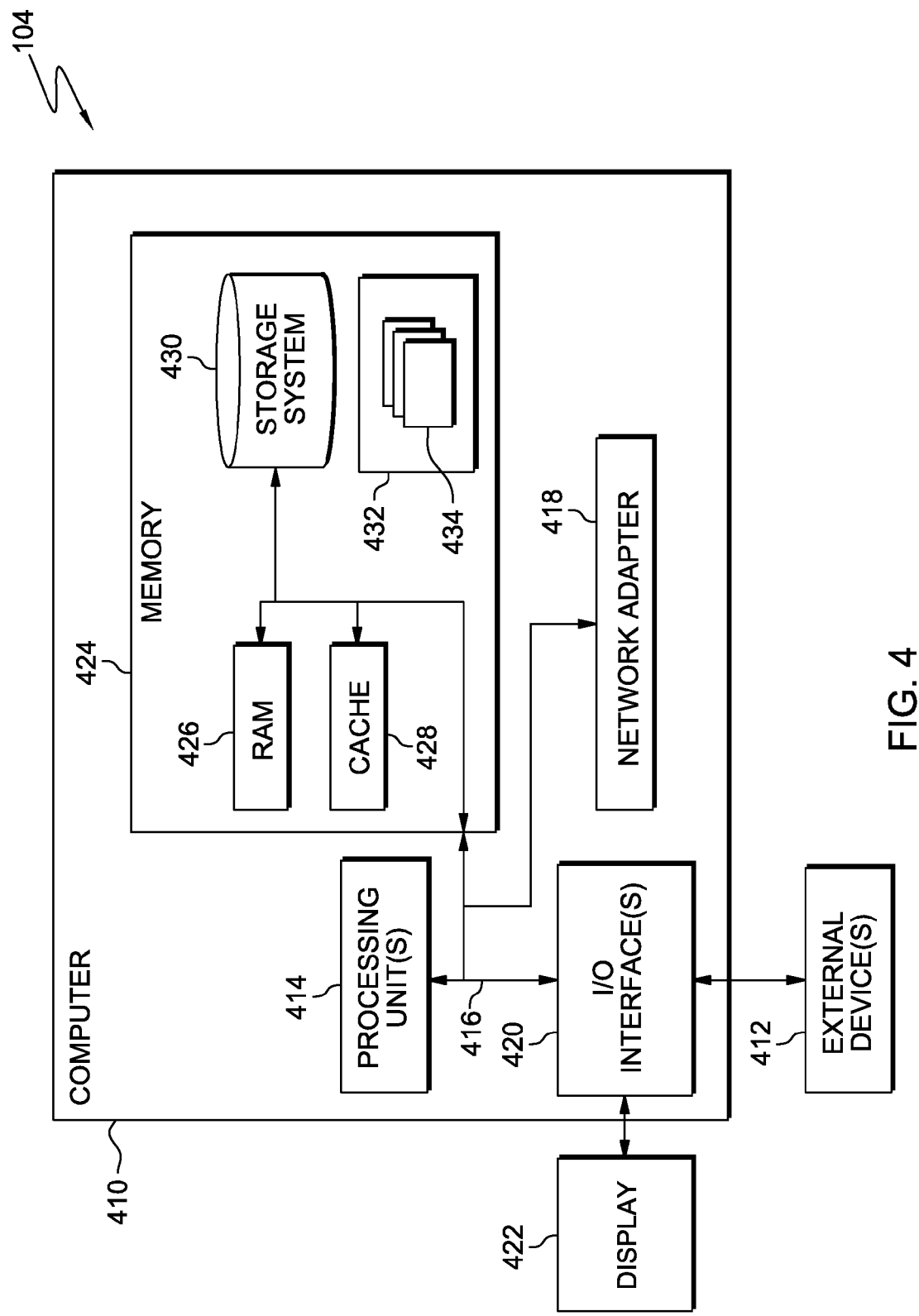
FIG. 4 is a block diagram depicting components of a data processing system (such the mobile device of FIG. 1), in accordance with an embodiment of the present invention.

FIG. 4 is a block diagram, generally designated 400, depicting components of a data processing system (such as mobile device 104 of data processing environment 100), in accordance with an embodiment of the present invention. It should be appreciated that FIG. 4 provides only an illustration of one implementation and does not imply any limitations with regard to the environments in that different embodiments can be implemented. Many modifications to the depicted environment can be made.

In the illustrative embodiment, mobile device 104 in data processing environment 100 is shown in the form of a general-purpose computing device. The components of computer system 410 can include, but are not limited to, one or more processors or processing unit(s) 414, memory 424, and bus 416 that couples various system components including memory 424 to processing unit(s) 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media can be any available media that is accessible by computer system 410, and it includes both volatile and non-volatile media, removable and non-removable media.

Memory 424 can include computer system readable media in the form of volatile memory, such as random access memory (RAM) 426 and/or cache memory 428. Computer system 410 can further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, memory 424 can include at least one computer program product having a set (e.g., at least one) of program modules that are configured to carry out the functions of embodiments of the invention.

Program/utility 432, having one or more sets of program modules 434, can be stored in memory 424 by way of example, and not limitation, as well as an operating system, one or more application programs, other program modules, and program data. Each of the operating systems, one or more application programs, other program modules, and program data, or some combination thereof, can include an implementation of a networking environment. Program modules 434 generally carry out the functions and/or methodologies of embodiments of the invention as described herein. Computer system 410 can also communicate with one or more external devices 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems can be used in conjunction with computer system 410.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A computer program product for a crossing aid on a mobile device, the computer program product comprising:
   one or more computer readable storage media and program instructions stored on the one or more computer readable storage media, the program instructions comprising:
   program instructions to determine, by a first computer processor, a unique ID associated with a crossing signal, wherein determining the unique ID associated with the crossing signal includes scanning a machine-readable tag of the crossing signal via near field communication;
   program instructions to search, by the first computer processor, for a wireless access point (WAP) having the unique ID;
   program instructions to determine, by the first computer processor, whether the WAP having the unique ID is found, wherein determining whether the WAP having the unique ID is found includes determining a service set identifier (SSID) of the WAP includes the unique ID extracted from a machine-readable tag of the crossing signal;
   responsive to determining that the WAP having the unique ID is found, program instructions to determine, by the first computer processor, haptic feedback; and
   program instructions to initiate, by the first computer processor, the haptic feedback on the mobile device to aid in crossing.

2. The computer program product of claim 1, wherein program instructions to determine a unique ID associated with the crossing signal, further comprises program instructions to extract, by the first computer processor, unique ID information embedded in the machine-readable tag of the crossing signal.

3. The computer program product of claim 2, wherein program instructions to extract unique ID information embedded in a machine-readable tag, further comprises program instructions to scan, by the first computer processor, the machine-readable tag of a crossing signal.

4. The computer program product of claim 1, further comprising:
   program instructions to configure, by a second computer processor, the service set identifier (SSID) for the WAP with the unique ID of the crossing signal;
   program instructions to update, by the second computer processor, the SSID for the WAP with a countdown value, the countdown value representing an amount of time remaining before a pedestrian right of way expires at the crossing signal; and
   program instructions to broadcast, by the second computer processor, the WAP with the SSID, wherein the SSID includes both the unique ID for the crossing signal and the countdown value.

5. The computer program product of claim 1 further comprises:

program instructions to determine, by the first computer processor, that a WAP matching the unique ID is not found when the SSID of the WAP does not include the unique ID of the crossing signal.

6. The computer program product of claim 1, wherein program instructions to determine haptic feedback, further comprises:

program instructions to utilize, by the first computer processor, a countdown value included in the SSID for the WAP to determine haptic feedback proportional to an amount of time remaining before a pedestrian right of way expires at the crossing signal.

7. The computer program product of claim 1, wherein program instructions to initiate haptic feedback on the mobile device, further comprises:

program instructions to enable, by the first computer processor, an internal mechanism within the mobile device designed to produce tactile feedback; and program instructions to determine, by the first computer processor, whether a countdown value is "0".

8. The computer program product of claim 7, wherein program instructions to determine whether the countdown value is "0", further comprises:

program instructions to extract, by the first computer processor, the countdown value from the SSID for the WAP of the crossing signal.

9. A computer system for a crossing aid on a mobile device, the computer system comprising:

one or more computer processors;

one or more computer readable storage media;

program instructions stored on at least one of the one or more computer readable storage media for execution by at least one of the one or more computer processors, the program instructions comprising:

program instructions to determine, by a first computer processor, a unique ID associated with a crossing signal, wherein determining the unique ID associated with the crossing signal includes scanning a machine-readable tag of the crossing signal via near field communication;

program instructions to search, by the first computer processor, for a wireless access point (WAP) having the unique ID;

program instructions to determine, by the first computer processor, whether the WAP having the unique ID is found, wherein determining whether the WAP having the unique ID is found includes determining a service set identifier (SSID) of the WAP includes the unique ID extracted from a machine-readable tag of the crossing signal;

responsive to determining that the WAP having the unique ID is found, program instructions to determine, by the first computer processor, haptic feedback; and program instructions to initiate, by the first computer processor, the haptic feedback on the mobile device to aid in crossing.

10. The computer system of claim 9, further comprising:

program instructions to configure, by a second computer processor, the service set identifier (SSID) for the WAP with the unique ID of the crossing signal;

program instructions to update, by the second computer processor, the SSID for the WAP with a countdown value, the countdown value representing an amount of time remaining before a pedestrian right of way expires at the crossing signal; and program instructions to broadcast, by the second computer processor, the WAP with the SSID, wherein the SSID includes both the unique ID for the crossing signal and the countdown value.

* * * * *